(12) United States Patent
Hasegawa

(10) Patent No.: US 9,332,149 B2
(45) Date of Patent: May 3, 2016

(54) IMAGE PROCESSING APPARATUS CAPABLE OF GENERATING IMAGE INCLUDING ARRANGED IMAGES

(71) Applicant: Brother Kogyo Kabushiki Kaisha, Nagoya-shi, Aichi-ken (JP)

(72) Inventor: Tomohiko Hasegawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/466,445

(22) Filed: Aug. 22, 2014

(65) Prior Publication Data
US 2015/0055154 A1 Feb. 26, 2015

(30) Foreign Application Priority Data

Aug. 23, 2013 (JP) ................................. 2013-173655

(51) Int. Cl.
| | |
|---|---|
| *G06T 11/40* | (2006.01) |
| *H04N 1/04* | (2006.01) |
| *G06T 11/00* | (2006.01) |
| *G06T 11/20* | (2006.01) |
| *G06T 11/60* | (2006.01) |

(52) U.S. Cl.
CPC ................ *H04N 1/04* (2013.01); *G06T 11/001* (2013.01); *G06T 11/203* (2013.01); *G06T 11/60* (2013.01); *H04N 2201/0094* (2013.01)

(58) Field of Classification Search
None
See application file for complete search history.

(56) References Cited

U.S. PATENT DOCUMENTS

| | | | | | |
|---|---|---|---|---|---|
| 5,883,627 | A | * | 3/1999 | Pleyer ............................ | 345/629 |
| 5,947,619 | A | * | 9/1999 | Kurashina et al. ......... | 400/615.2 |
| 7,623,733 | B2 | * | 11/2009 | Hirosawa ....................... | 382/284 |
| 8,588,548 | B2 | * | 11/2013 | Krolczyk et al. ............. | 382/284 |
| 8,817,041 | B2 | * | 8/2014 | Socha et al. .................. | 345/619 |
| 8,861,868 | B2 | * | 10/2014 | Shechtman et al. .......... | 382/218 |

FOREIGN PATENT DOCUMENTS

| | | |
|---|---|---|
| JP | 2007-140593 A | 6/2007 |
| JP | 2007-235189 A | 9/2007 |
| JP | 04-594848 B2 | 12/2010 |

\* cited by examiner

*Primary Examiner* — Paul F Payer
(74) *Attorney, Agent, or Firm* — Banner & Witcoff, Ltd.

(57) ABSTRACT

An image processing apparatus includes a processor and a memory storing instructions, the instructions, when executed by the processor, causing the image processing apparatus to perform: receiving first image data representing a first image; specifying a partial image included in the first image; specifying an internal area included in the partial image; and generating a second image in which more than two of the partial image are continuously arranged as first partial image and a second partial image, wherein the second partial image is arranged continuously to the first partial image and overlaps with the internal area of the first partial image.

18 Claims, 14 Drawing Sheets

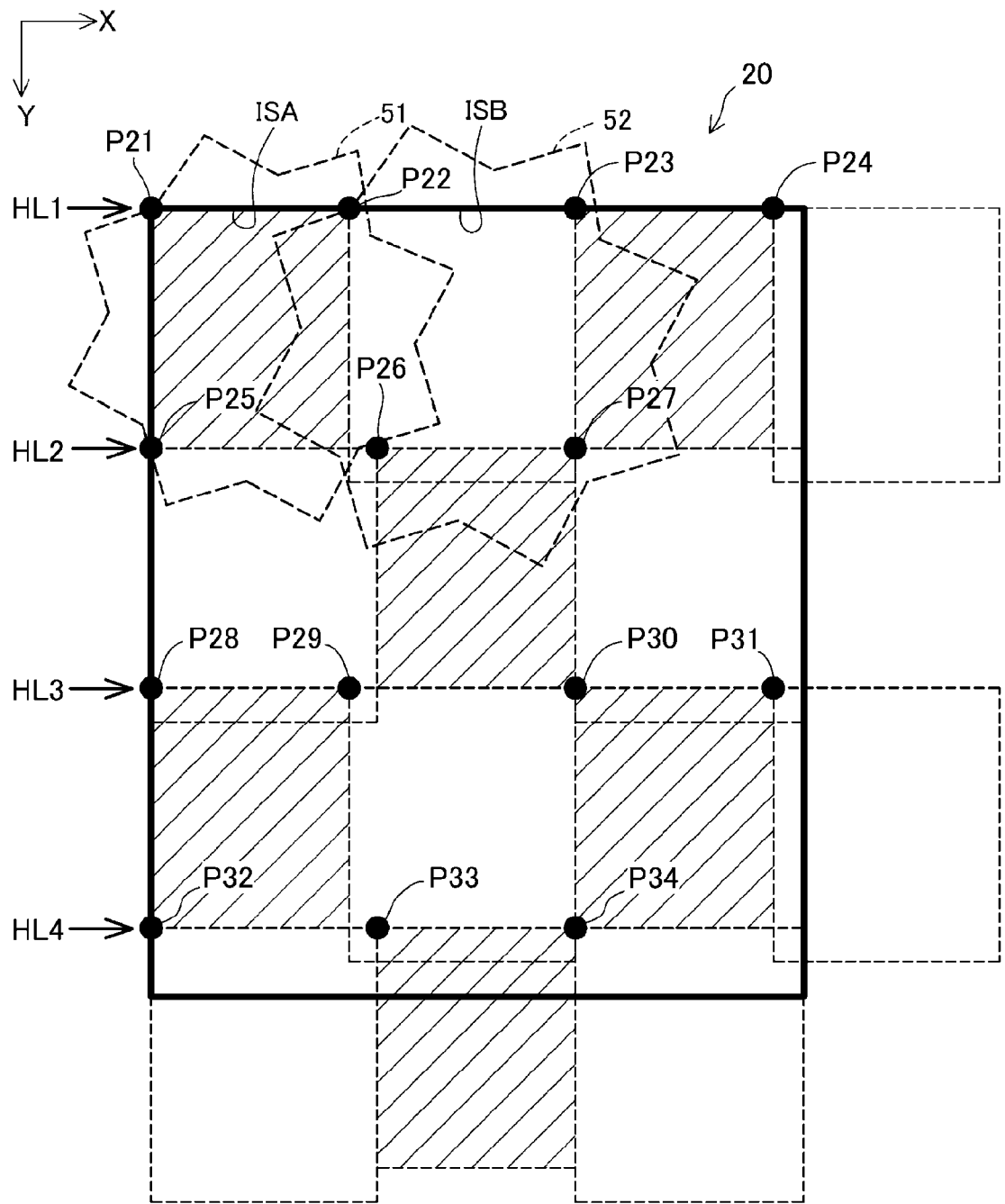

MODIFIED ILLUSTRATIVE EMBODIMENT

IMAGE PROCESSING APPARATUS CAPABLE OF GENERATING IMAGE INCLUDING ARRANGED IMAGES

CROSS-REFERENCE TO RELATED APPLICATIONS

This application claims priority from Japanese Patent Application No. 2013-173655 filed on Aug. 23, 2013, the entire subject-matter of which is incorporated herein by reference.

TECHNICAL FIELD

The disclosure relates to an image processing technology, and more specifically, to an image processing technology of generating an image different from an original image by using the original image.

BACKGROUND

It has been implemented that an original image acquired by a digital camera and the like is used to generate a separate image. For example, there has been proposed a technology of synthesizing a face area in a photograph image and a frame image. As a result, it is possible to generate an image having a good outward appearance including the face area.

SUMMARY

Illustrative aspects of the disclosure provide a novel technology of generating a second image by using a first image.

According to one illustrative aspect of the disclosure, there is provided an image processing apparatus comprising: a processor; and a memory storing instructions, the instructions, when executed by the processor, causing the image processing apparatus to perform: acquiring first image data representing a first image; specifying a partial image included in the first image; specifying an internal area included in the partial image; and generating a second image in which a plurality of the partial images is continuously arranged, wherein the plurality of partial images arranged in the second image comprises: a first partial image; and a second partial image that is arranged continuously to the first partial image and overlaps with the internal area of the first partial image.

BRIEF DESCRIPTION OF THE DRAWINGS

FIG. 15 illustrates an example of the canvas area 20 and the arranging position in a modified exemplary embodiment.

DETAILED DESCRIPTION

General Overview

Figure 1:
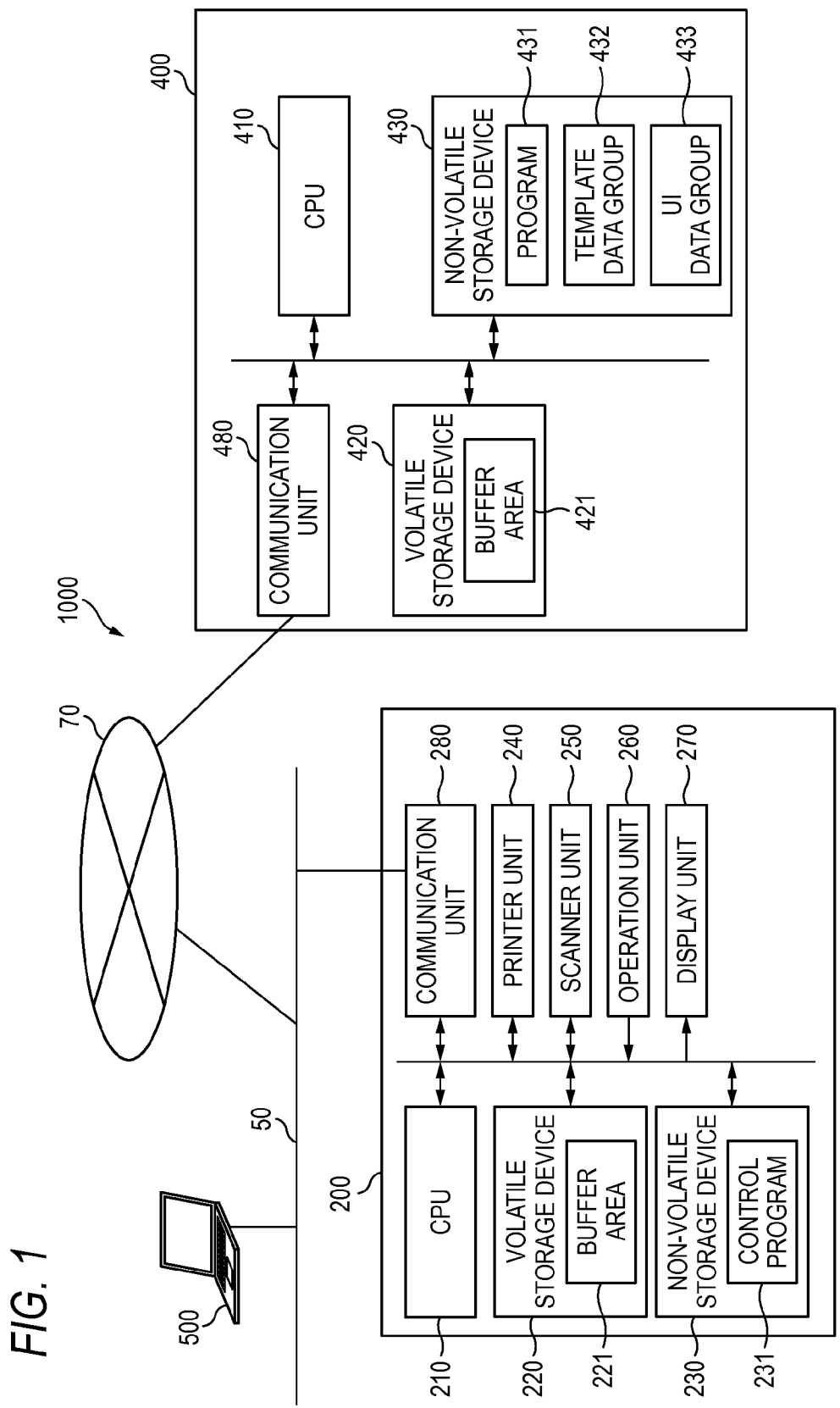
FIG. 1 is a block diagram showing a configuration of an image processing system according to one illustrative embodiment.

Generation of a second image having a good outward appearance by using a first image is useful, because it is possible to widen a utility of the first image.

Therefore, illustrative aspects of the disclosure provide a novel technology of generating a second image by using a first image.

According to an illustrative aspect (1) of the disclosure, there may be provided an image processing apparatus comprising: a processor; and a memory storing instructions, the instructions, when executed by the processor, causing the image processing apparatus to perform: acquiring first image data representing a first image; specifying a partial image included in the first image; specifying an internal area included in the partial image; and generating a second image in which a plurality of the partial images is continuously arranged, wherein the plurality of partial images arranged in the second image comprises: a first partial image; and a second partial image that is arranged continuously to the first partial image and overlaps with the internal area of the first partial image.

According to the above configuration, the second image in which the plurality of partial images including the first partial image and the second partial image overlapping with the internal area of the first partial image is continuously arranged is generated. As a result, it is possible to suppress a gap from occurring between the first partial image and the second partial image, thereby improving an outward appearance of the second image. Therefore, it is possible to generate the second image having a good outward appearance by using the first image.

In another illustrative aspect (2) of the image processing apparatus of (1), the generating the second image may comprise generating the second image in which a plurality of partial images is arranged without a gap therebetween.

According to the above configuration, since the second image in which the plurality of partial images is arranged without a gap is generated, it is possible to further improve the outward appearance of the second image.

In still another illustrative aspect (3) of the image processing apparatus of (1) or (2), the generating the second image may comprise generating the second image in which the internal area of the first partial image and the internal area of the second partial image abut on each other.

According to the above configuration, it is possible to suppress a gap from occurring between the first partial image and the second partial image, more appropriately.

In still another illustrative aspect (4) of the image processing apparatus of any one of (1) to (3), the generating the second image may comprise generating the second image in which all sides configuring the internal area of the first partial image abut on any one of a plurality of sides configuring the internal area of other partial images.

According to the above configuration, it is possible to more securely generate the second image in which the plurality of partial images is arranged without a gap.

In still another illustrative aspect (5) of the image processing apparatus of any one of (1) to (4), the specifying the partial image may comprise: classifying a plurality of pixels in an area having at least the partial image of the first image into background pixels representing a background and object pixels representing an object; and specifying the partial image configured by the plurality of object pixels.

According to the above configuration, it is possible to appropriately specify the partial image.

In still another illustrative aspect (6) of the image processing apparatus of (5), the specifying the partial image may comprise specifying the partial image configured by the plurality of continuing object pixels.

According to the above configuration, the second image is generated by arranging the plurality of partial images configured by the plurality of continuing object pixels. Therefore, it is possible to suppress a gap from occurring between objects in the second image in which a plurality of objects is arranged.

In still another illustrative aspect (7) of the image processing apparatus of any one of (1) to (6), the internal area may be an inscribed rectangle that is a rectangle inscribed in an outline of the partial image.

According to the above configuration, it is possible to more securely generate the second image in which the plurality of partial images is arranged without a gap therebetween.

In still another illustrative aspect (8) of the image processing apparatus of (7), the inscribed rectangle may be a maximum rectangle inscribed in the outline of the partial image.

According to the above configuration, since it is possible to suppress an area, in which the plurality of partial images overlaps with each other, from being excessively increased, it is possible to improve the outward appearance of the second image.

In still another illustrative aspect (9) of the image processing apparatus of any one of (1) to (8), the second image may comprise a third partial image that is arranged continuously to the second partial image, the first partial image, the second partial image and the third partial image may be arranged in a specific direction, and wherein the second partial image may be arranged to overlap the first partial image and the third partial image.

According to the above configuration, the second partial image overlaps the first partial image and the third partial image, so that the outward appearance of the second image can be improved.

In still another illustrative aspect (10) of the image processing apparatus of (9), the second image may comprise a plurality of the partial images configuring a first line following the specific direction and a plurality of the partial images configuring a second line adjacent to the first line and following the specific direction, the even partial image of the first line may be arranged to overlap the odd partial image of the first line, and the odd partial image of the second line may be arranged to overlap the even partial image of the second line.

According to the above configuration, the plurality of partial images overlaps, so that the outward appearance of the second image can be improved.

In still another illustrative aspect (11) of the image processing apparatus of (10), a sequence of overlapping the plurality of partial images in the second image may be randomly determined.

According to the above configuration, the plurality of partial images overlaps, so that the outward appearance of the second image can be improved.

In still another illustrative aspect (12) of the image processing apparatus of any one of (1) to (11), the instructions, when executed by the processor, may cause the image processing apparatus to further perform changing a size of the partial image, and the generating the second image may comprise generating the second image in which the plurality of partial images having different sizes is continuously arranged.

According to the above configuration, the plurality of partial images has different sizes, so that the outward appearance of the second image can be improved.

In still another illustrative aspect (13) of the image processing apparatus of (12), the second image may comprise: a first partial image group comprising the plurality of partial images arranged in a specific direction and having different sizes; and a second partial image group comprising the plurality of partial images, the second partial image group being adjacent to the first partial image group in a direction intersecting with the specific direction, and the generating the second image may comprise arranging the second partial image group with respect to the first partial image group, based on the internal area of the smallest partial image belonging to the first partial image group.

According to the above configuration, it is possible to suppress a gap from occurring between the first partial image group and the second partial image group. As a result, the outward appearance of the second image can be improved.

In still another illustrative aspect (14) of the image processing apparatus of (12), the changing the size of the partial image may comprise magnifying sizes of the plurality of partial images at different magnifications, the second image may comprise: a first partial image group comprising the plurality of partial images arranged in a specific direction and having different sizes; and a second partial image group comprising the plurality of partial images adjacent to the first partial image group in a direction intersecting with the specific direction, and the generating the second image may comprise arranging the second partial image group with respect to the first partial image group, based on the internal area of the partial size having a size before the magnification.

According to the above configuration, it is possible to suppress a gap from occurring between the plurality of partial images. As a result, the outward appearance of the second image can be improved.

In still another illustrative aspect (15) of the image processing apparatus of any one of (1) to (14), the instructions, when executed by the processor, may cause the image processing apparatus to further perform changing a color of the partial image, and the second image may comprise the plurality of partial images having different colors.

According to the above configuration, the plurality of partial images has different colors, so that the outward appearance of the second image can be improved.

In still another illustrative aspect (16) of the image processing apparatus of (15), the changing the color of the partial image may comprise changing colors of the plurality of partial images stepwise in accordance with an overlapping sequence of the partial images in the second image.

According to the above configuration, since the colors of the plurality of partial images are stepwise changed in accordance with the overlapping sequence of the plurality of partial images, the outward appearance of the second image can be improved.

In still another illustrative aspect (17) of the image processing apparatus of any one of (1) to (16), the instructions, when executed by the processor, may cause the image processing apparatus to further perform outputting first specific image data representing a specific image comprising the second image and second specific image data representing an image comprising the specific image and a blank, and a size of the specific image printed on a first-type sheet by using the first specific image data may be the same as a size of the specific image printed on a second-type sheet, which is larger than the first-type sheet, by using the second specific image data.

According to the above configuration, a user prints an image on the second-type sheet by using the second image data, so that the user can appropriately check a content of the specific image without printing the specific image on the first-type sheet.

Incidentally, the disclosure can be implemented in a variety of aspects. For example, the disclosure can be implemented in forms of an image processing method, a computer program for implementing functions or methods of an image processing apparatus, a non-transitory computer-readable recording medium having the computer program stored thereon, and the like.

Illustrative Embodiments

Configuration of Image Processing System 1000

FIG. 1 is a block diagram showing a configuration of an image processing system according to one illustrative embodiment. The image processing system 1000 has a server 400 serving as an image processing apparatus and a multi-function device 200. The server 400 is connected to an Internet 70 and the multi-function device 200 is connected to the Internet 70 through a LAN (which is an abbreviation of Local Area Network) 50. As a result, the server 400 and the multi-function device 200 can perform communication with each other through the LAN 50 and the Internet 70. Further, a PC 500 of a user of the multi-function device 200 may be connected to the LAN 50.

The server 400 has a CPU 410, a volatile storage device 420 such as a DRAM, a non-volatile storage device 430 such as a hard disk drive and a flash memory, and a communication unit 480 including an interface for connection to a network such as the Internet 70. The volatile storage device 420 is provided with a buffer area 421 that temporarily stores therein a variety of intermediate data generated when the CPU 410 executes processing. The non-volatile storage device 430 stores therein a computer program 431, a template data group 432 including a plurality of template image data and a UI data group 433, which will be described later.

The computer program 431 is provided with being stored in a DVD-ROM and the like, for example, and is installed in the server 400 by an administrator of the server 400. The CPU 410 executes the computer program 431, thereby implementing image processing that will be described later.

Figure 2A:
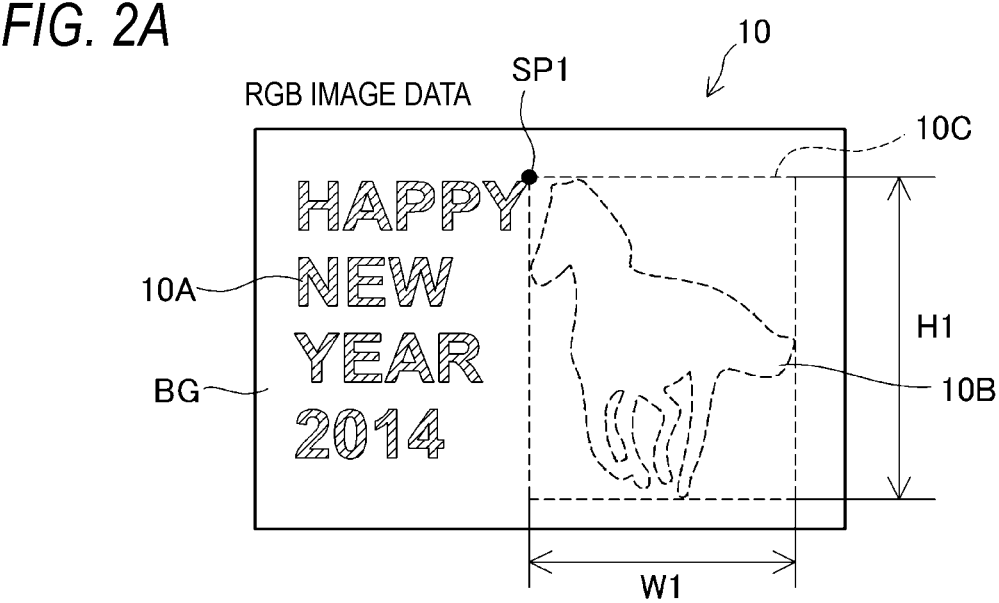
FIGS. 2A to 2C illustrate an example of template data.
Figure 2B:
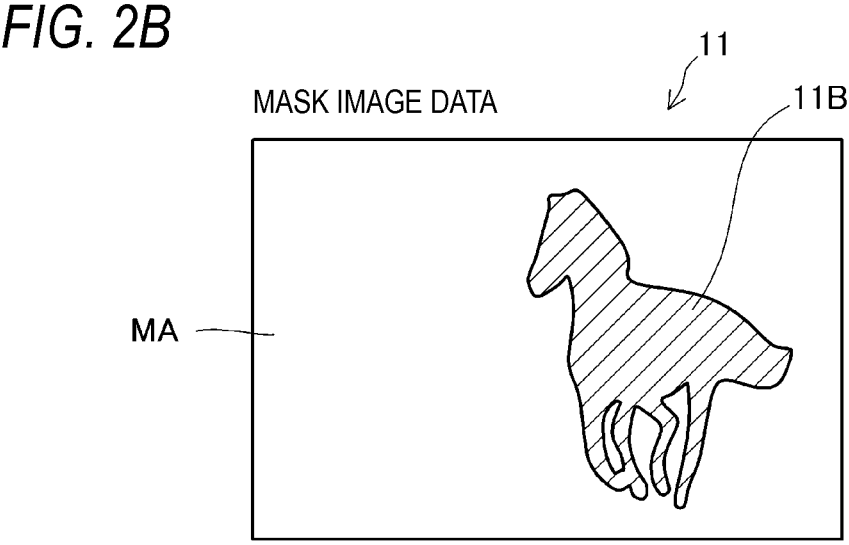
Figure 2C:
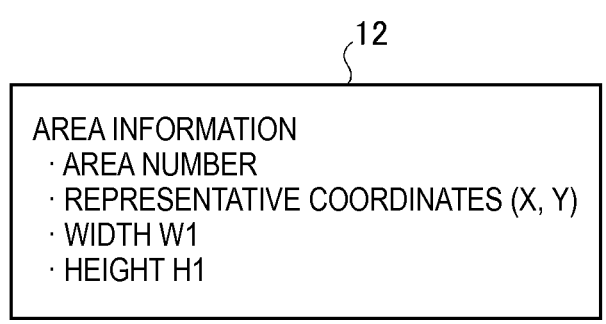

FIG. 2 illustrates an example of template data. One template data includes template image data representing a template image 10 (FIG. 2A), mask image data representing a mask image 11 (FIG. 2B) and area information 12.

The template image data is RGB image data, for example. In the example of FIG. 2, the template image 10 includes a background image BG in which an object such as letters 10A is designed and a synthesis target area 10B for synthesizing other images. A number, a shape and a size of the synthesis target area 10B and the design of the background image BG may be different in each template. The synthesis target area is an area in which an image in a texture image (which will be described later) is synthesized when generating a synthesis image by using the template image 10 in image processing (which will be described later).

The mask image 11 is an image for specifying the synthesis target area 10B in the template image 10. The mask image 11 has the same size (i.e., a number of pixels in a vertical direction and a number of pixels in a horizontal direction) as the template image 10. The pixels in the mask image 11 have two values of a first value and a second value. In the mask image 11, the first value indicates that a pixel in the corresponding template image 10 is a pixel configuring the background image BG. The second value indicates that a pixel in the corresponding template image 10 is a pixel configuring the synthesis target area 10B. For example, an alpha channel defining a transmissivity for each pixel is used for the mask image data. In this case, for example, the first value indicates that the transmissivity is 0%, i.e., is a value (for example, 255) indicating the opacity, and the second value indicates that the transmissivity is 100%, i.e., is a value indicating the transparency (for example, 0).

A non-hatched area MA in the mask image 11 is an area configured by a plurality of pixels having the first value. The area MA corresponds to the background image BG in the template image 10. A hatched area 11B in the mask image 11 is an area configured by a plurality of pixels having the second value. The area 11B corresponds to the synthesis target area 10B in the template image 10.

The area information 12 is information relating to the synthesis target area 10B. Specifically, the area information 12 includes an area number serving as an identifier identifying the synthesis target area 10B, coordinates of a representative point SP1 of the synthesis target area 10B, a width W1 (a length in a horizontal direction) and a height H (a length in a vertical direction). As the representative point SP1, a left-upper apex of a circumscribed rectangle 10C circumscribed to the synthesis target area 10B is used, for example.

The multi-function device 200 has a CPU 210, a volatile storage device 220 such as a DRAM, a non-volatile storage device 230 such as a flash memory and a hard disk drive, a printer unit 240, a scanner unit 250, an operation unit 260 such as a touch panel and a button, a display unit 270 such as a liquid crystal monitor and a communication unit 280 for performing communication with an external device. For example, the communication unit 280 includes an interface for connection to the network such as the LAN 50 and an interface for connection to an external storage device (for example, a USB memory).

The volatile storage device 220 is provided with a buffer area 221 that temporarily stores therein various data generated when the CPU 210 executes processing. The non-volatile storage device 230 stores therein a control program 231.

The printer unit 240 executes a printing by using a printing method such as an inkjet method and a laser method. The scanner unit 250 optically reads a document by using a photoelectric conversion element (for example, CCD, CMOS), thereby generating scan data.

The CPU 210 executes the control program 231, thereby controlling the multi-function device 200. For example, the CPU 210 controls the printer unit 240 and the scanner unit 250, thereby executing copy, printing, scan processing and the like. Further, the CPU 210 accesses the server 400 to execute service using processing of using a service that is provided by the server 400.

(Operations of Image Processing System 1000)

The CPU 410 of the server 400 executes image processing of generating a texture image (which will be describe later) and synthesizing the generated texture image in the template image to generate a synthesis image, in response to a request from the multi-function device 200 serving as a client. In this illustrative embodiment, the image processing is executed so as to implement an image generating service that is provided to the client by the server 400. Hereinafter, operations of the image processing system 1000 including the image generating service provided by the server 400 are described.

Figure 3:
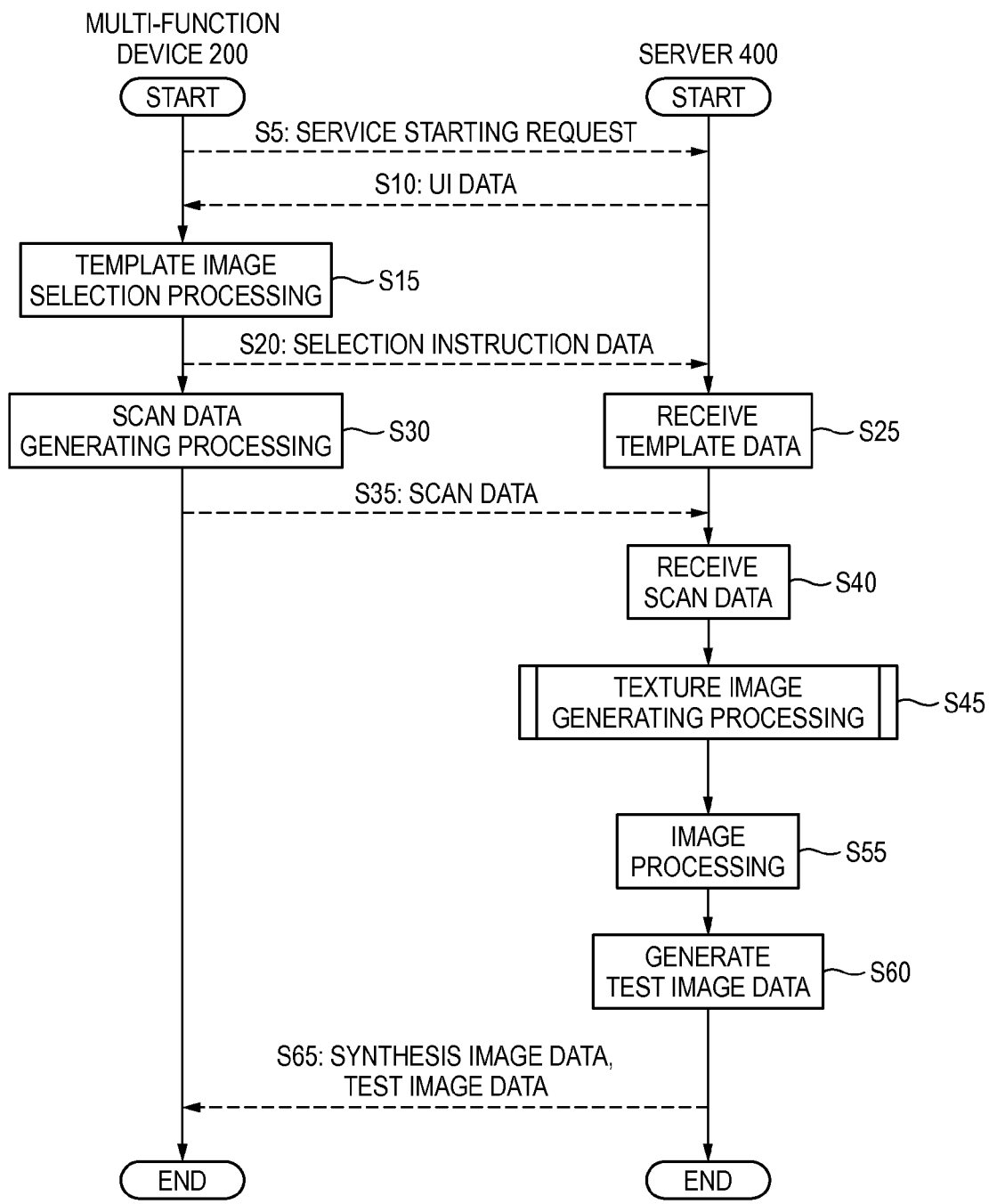
FIG. 3 is a flowchart showing operations of an image processing system 1000.

FIG. 3 is a flowchart showing operations of the image processing system 1000. The processing of the flowchart starts when the multi-function device 200 receives a using instruction of the image generating service provided by the server 400 from the user. Specifically, the image generating service is a service of generating a synthesis image to be printed on a postcard (for example, a New Year's card) by using the scan data generated through the scanner unit 250. The scan data is RDB image data, for example.

When the processing starts, the CPU 210 of the multi-function device 200 transmits a service starting request to the server 400 in step S5. When the service starting request is received, the CPU 410 of the server 400 selects UI data necessary to provide the image generating service from the UI data group 433 (FIG. 1) and transmits the UI data to the multi-function device 200 (step S10). Specifically, the UI data includes a variety of image data necessary to display a UI image and control data. The control data includes a variety of data that is necessary for the multi-function device 200 to execute predetermined processing (specifically, processing of S15, S20, S30, S35 and S40, which will be described later) by using the UI image, for example. For example, the control data includes information indicating processing that should be executed by the multi-function device 200 on the basis of a user's instruction received through the UI image (for example, FIG. 4), for example, processing of transmitting predetermined information to the server 400.

In step S15, the CPU 210 executes template image selection processing, based on the received UI data. The template image selection processing is processing of receiving an instruction to select a template image (for example, template image 10 shown in FIG. 2) from the user.

Figure 4A:
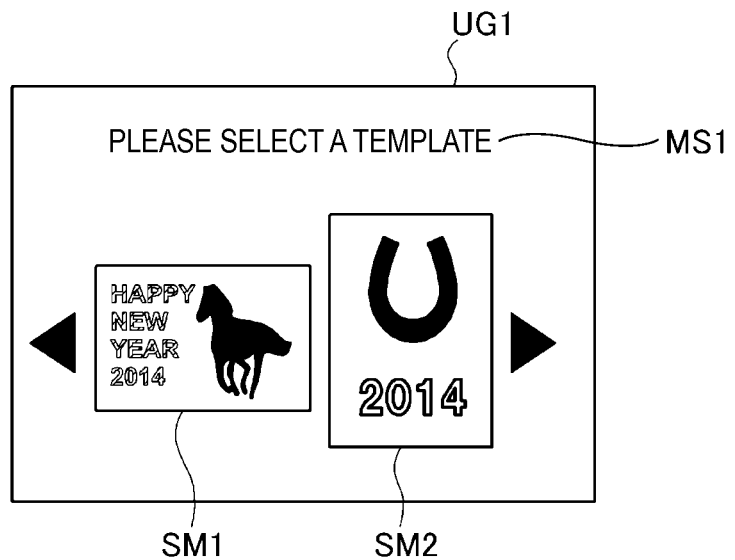
FIGS. 4A and 4B illustrate an example of a UI image.
Figure 4B:
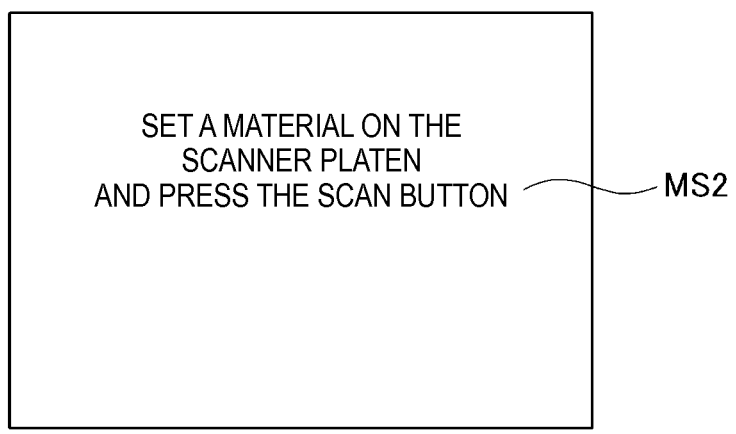

FIG. 4A illustrates an example of the UI image. First, the CPU 210 displays a UI image UG1 on the display unit 270 and receives a selection of a template image to be used from the user. For example, the UI image UG1 includes a plurality of thumbnail images SM1, SM2 indicating a plurality of selectable template images and a message MS1 prompting the user to select a template image. The data group included in the UI data received from the server 400 is used for the image data group indicating the UI image UG1 and the thumbnail images SM1, SM2.

In step S20, the CPU 210 transmits selection instruction data, which includes information designating the template image selected by the user, to the server 400.

In step S25, the CPU 410 of the server 400 receives template data (FIG. 2) corresponding to the template image selected by the user from the template data group 432 (FIG. 1) stored in the non-volatile storage device 430, based on the received selection instruction data. The template data may be obtained from an external device, for example, another server or external storage device connected to the server 400. Incidentally, subsequent processing is described with reference to an example where the template image 10 shown in FIG. 2 is selected by the user.

Following the transmission of the selection instruction data in step S20, the CPU 210 of the multi-function device 200 executes scan data generating processing (step S30). The scan data generating processing is processing of generating scan data that is used to generate the texture image (which will be describe later) to be synthesized in the template image 10. Specifically, the CPU 210 displays a UI image UG2 of FIG. 4B on the display unit 270. The UI image UG2 includes a message MS2 urging the user to enable the scanner unit 250 to read a material to be used. In this illustrative embodiment, the material to be used includes an article that is relatively thin and has a variety of patterns and shapes, specifically, a plant leaf, a cloth, Japanese paper, colored paper, a metal plate and the like. Hereinafter, following processing is described with reference to an example where the plant leaf is used as the material. In step S30, the CPU 210 reads a material prepared by the user through the scanner unit 250, thereby generating scan data.

Figure 5A:
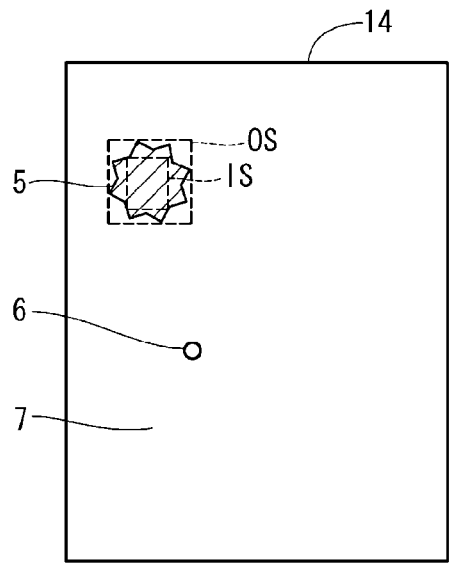
FIGS. 5A and 5B illustrate an example of a scan image.

FIG. 5 illustrates an example of the scan image. A scan image 14 of FIG. 5A is an image represented by scan data that is obtained by reading a plant leaf. The scan image 14 includes a partial image 5 representing the plant leaf as the material, a partial image 6 representing a foreign material and a background image 7.

When the scan data is generated, the CPU 210 transmits the generated scan data to the server 400 in step S35. As a result, the CPU 410 of the server 400 acquires the scan data (step S40).

In step S45, the CPU 410 executes texture image generating processing. In the texture image generating processing, texture image data representing a texture image, in which a plurality of material images, which are partial images of the scan image 14, is continuously arranged, is generated.

Figure 6:
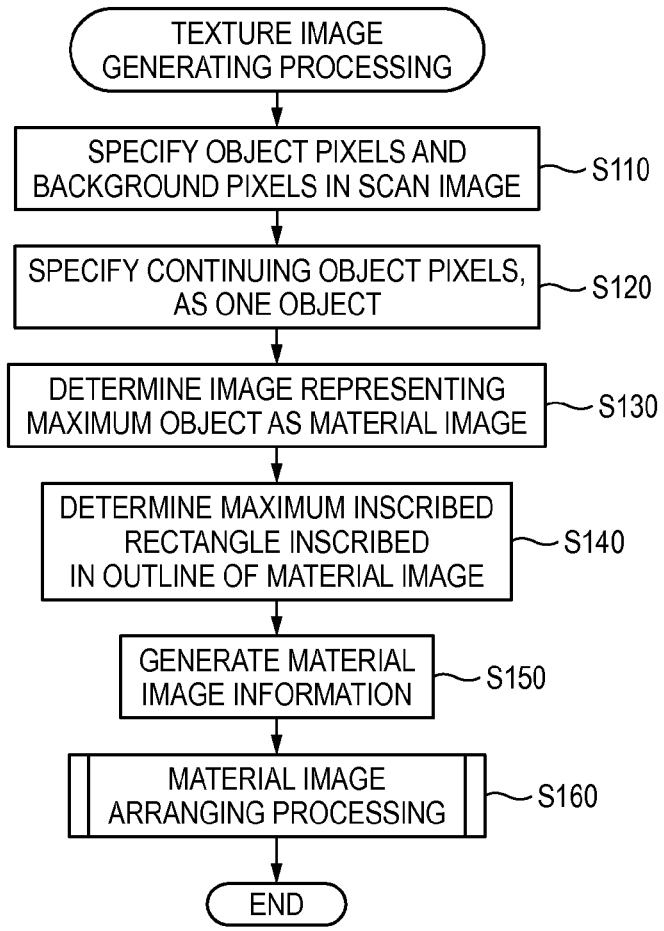
FIG. 6 is a flowchart showing texture image generation processing.

FIG. 6 is a flowchart of the texture image generating processing. In step S110, the CPU 410 specifies object pixels and background pixels in the scan image 14 (FIG. 5A). Specifically, the CPU 410 binarizes the scan data to thus classify pixels thereof into background pixels having a background color (for example, white) and object pixels having a color different from the background color.

FIG. 6B shows a binary image 15 represented by the binarized scan data. In the binary image 15, a black area indicates an area configured by the object pixels and a white area indicates an area configured by the background pixels.

Figure 5B:
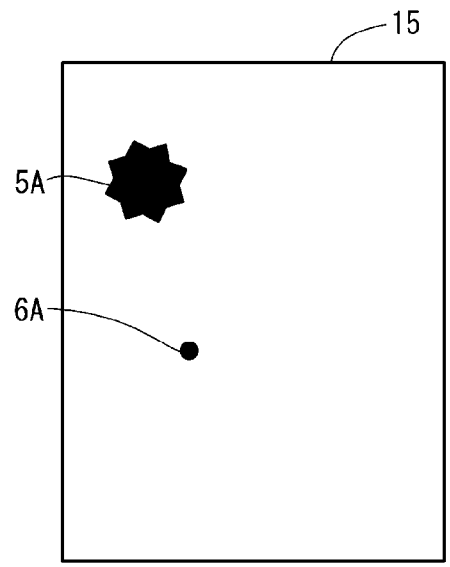

In step S120, the CPU 410 specifies a plurality of continuing object pixels in the binary image 15, as one object. In the example of FIG. 5B, two areas 5A, 6A corresponding to the two objects in the scan image 14, i.e., the plant leaf and the foreign material are specified. As a result, the partial image 5 representing the leaf and the partial image 6 representing the foreign material in the scan image 14 are specified. As a result, it is possible to appropriately specify the partial image 5, which will be used as a material image later, in the scan image 14.

In step S130, the CPU 410 determines, as a material image, an image representing an object having a maximum size of the specified objects. A size of an object can be represented by a number of object pixels configuring the object. In the example of FIG. 5, since a size of the partial image 5 representing the leaf in the scan image 14 is larger than the partial image 6 representing the foreign material, it is possible to appropriately determine the partial image 5 representing the leaf, as a material image. Hereinafter, the partial image 5 representing the leaf is referred to as a material image 5.

In step S140, the CPU 410 determines a maximum inscribed rectangle IS inscribed in an outline of the material image 5 (FIG. 5A). The maximum inscribed rectangle IS is determined by a well-known method. For example, Japanese Patent Application Publication No. 2007-140593A discloses a method of repeating processing of scanning a predetermined area of an image with a rectangular mask having a predetermined aspect ratio to thus record a maximum size of the rectangular mask included in the predetermined area by using masks having a variety of aspect ratios.

Figure 7A:
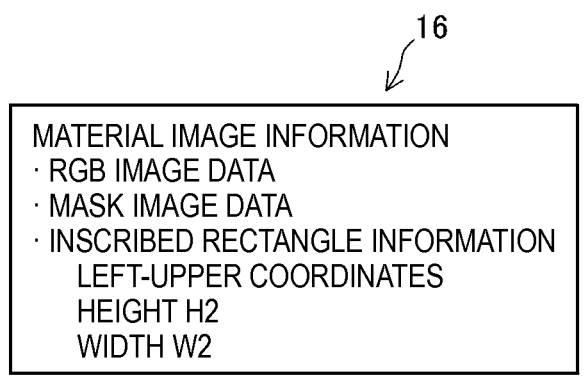
FIGS. 7A to 7C illustrate an example of material image information 16.
Figure 7B:
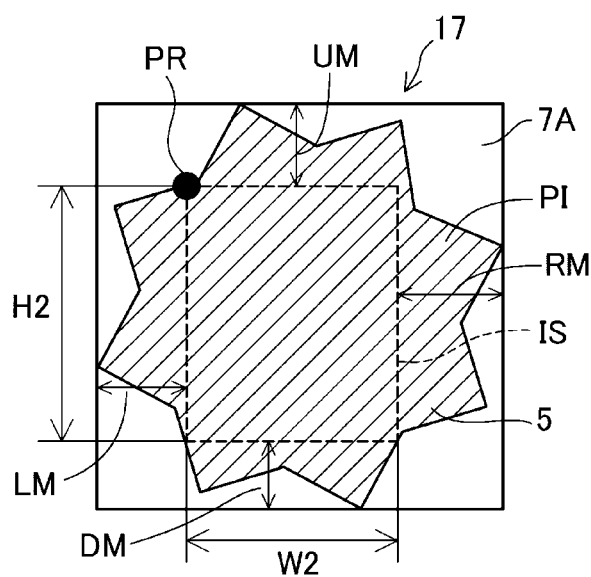

In step S150, the CPU 410 generates material image information 16. FIG. 7A illustrates an example of the material image information 16. The material image information 16 includes RGB image data, mask image data and inscribed rectangle information (FIG. 7A). FIG. 7B illustrates an example of a material rectangle image 17 represented by the RGB image data included in the material image information 16.

The material rectangle image 17 is an image that is obtained by cutting an area (FIG. 5A) corresponding to a circumscribed rectangle OS circumscribed to the material image 5 from the scan image 14. Therefore, the material rectangle image 17 includes the material image 5 in the scan image 14 and a background image 7A that is a part of the background image 7 in the scan image 14 (FIG. 7B).

Figure 7C:
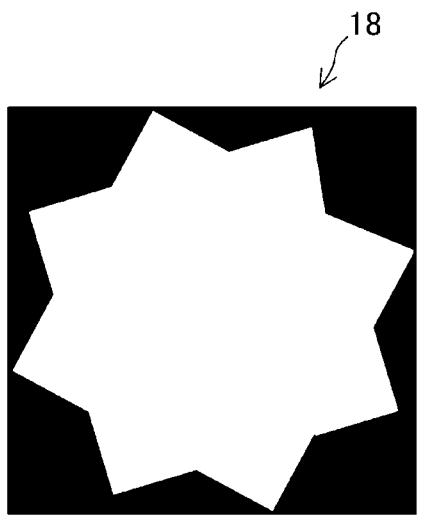

FIG. 7C illustrates an example of a mask image 18 represented by the mask image data. For example, like the mask image data representing the mask image 11 (FIG. 2) for the template image 10, the alpha channel defining a transmissivity for each pixel is used for the mask image data. The mask image 18 has the same size as the material rectangle image 17. Like the mask image 11 (FIG. 2) for the template image 10, the pixels in the mask image 18 have two values of the first value (for example, 255) and the second value (for example, 0). In the mask image 18, the first value indicates that a pixel in the corresponding material rectangle image 17 is a pixel configuring the material image 5. The second value indicates that a pixel in the corresponding material rectangle image 17 is a pixel configuring a background image 7A. The mask image data is generated using the binarized scan data (FIG. 5B), for example.

The inscribed rectangle information is information indicating a position and a size of the inscribed rectangle IS (FIG. 7B) determined in step S140. Specifically, the inscribed rectangle information includes coordinates of a representative point PR of the inscribed rectangle IS, a width W2 and a height H2. As the representative point PR, a left-upper apex of the inscribed rectangle IS is used, for example.

Figure 8:
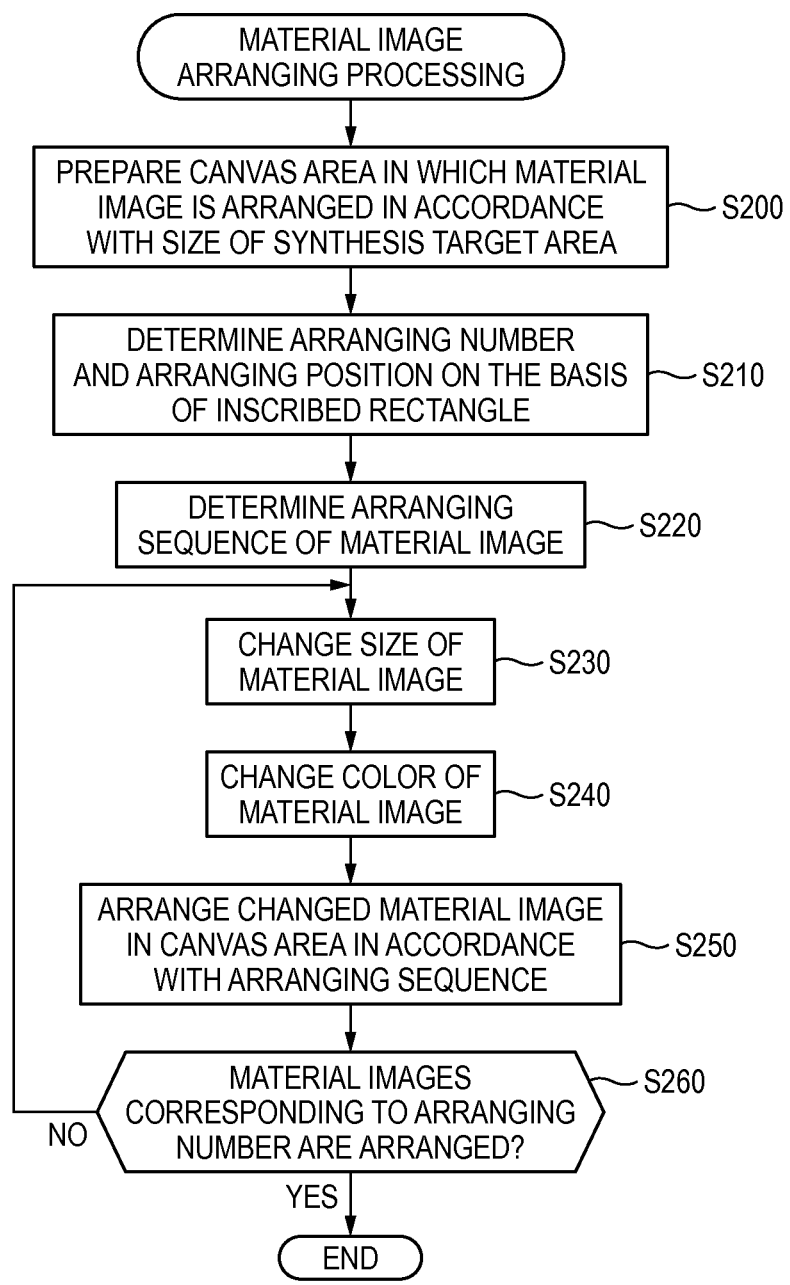
FIG. 8 is a flowchart of material image arranging processing.
Figure 9:
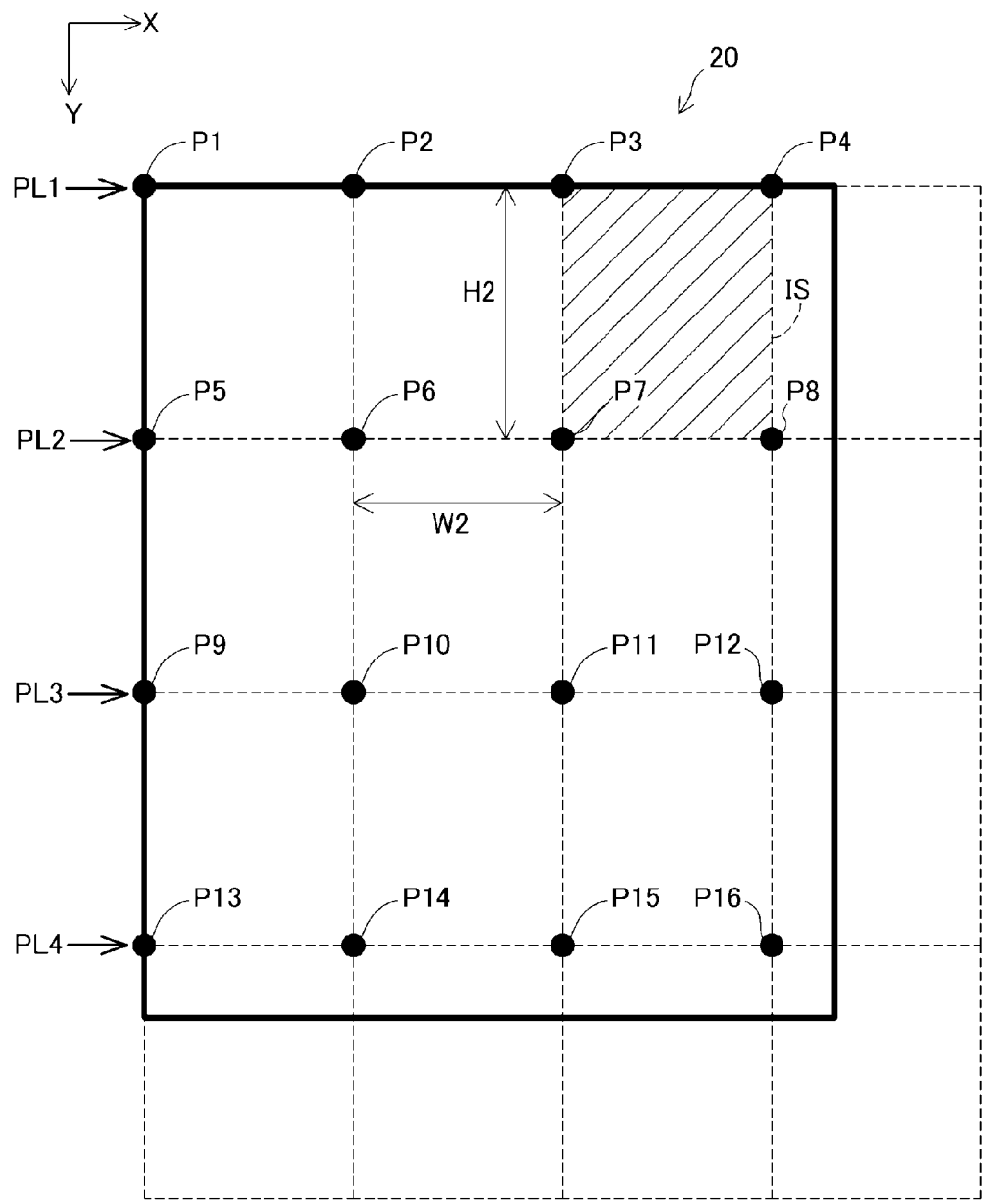
FIG. 9 illustrates an example of a canvas area 20 and arranging positions.

When the material image information 16 is generated, the CPU 410 executes material image arranging processing in step S160 (FIG. 6). FIG. 8 is a flowchart of the material image arranging processing. FIG. 9 illustrates an example of a canvas area 20 and arranging positions. The material image arranging processing is processing of arranging a plurality of material images 5 in the canvas area 20, based on the inscribed rectangle IS.

In step S200, the CPU 410 prepares the canvas area 20 for arranging the material images 5. A size of the canvas area 20 is set to be larger than a size of the synthesis target area 10B (FIG. 2A). The size of the canvas area 20 is set to be the same as the template image 10 or the circumscribed rectangle 10C (FIG. 2A) of the synthesis target area 10B, for example.

In step S210, the CPU 410 determines a number of arrangements PN and arranging positions of the material images 5, based on the inscribed rectangle IS of the material image 5. Specifically, a number and positions of lattice points P1 to P16, which are obtained by arranging a plurality of inscribed rectangles IS in a lattice shape without a gap in the canvas area 20, are determined as the number of arrangements and arranging positions of the material images 5. In FIG. 9, one inscribed rectangle IS is hatched. In the example of FIG. 9, the number of arrangements PN of the material image 5 is 16. Further, when setting coordinates of a left-upper corner of the canvas area 20 as an origin (0, 0), coordinates of the arranging positions P1, P2, P3 are (0, 0), (W2, 0) and (2×W2, 0), respectively. Further, coordinates of the arranging positions P5, P6, P7 are (0, H2), (W2, H2) and (2×W2, H2), respectively. W2 and H2 indicate the width W2 and the height H2 of the inscribed rectangle IS (FIG. 7).

Figure 10:
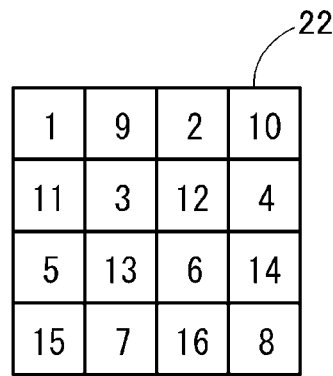
FIG. 10 illustrates an example of ordinal data 22.

In step S220, the CPU 410 determines an arranging sequence AN (1≤AN≤PN) of the material images 5 having the number of arrangements PN and generates ordinal data 22 indicating the arranging sequence. FIG. 10 illustrates an example of the ordinal data 22. The ordinal data 22 is sequence data having a size corresponding to the arranging positions of the material images 5, for example. For instance, the ordinal data 22 of FIG. 10 is 4×4 sequence data corresponding to 16 arranging positions (FIG. 9) of width 4×height 4. Each value in the ordinal data 22 indicates the arranging sequence AN of the material image 5.

In this illustrative embodiment, four arranging lines PL1 to PL4 along the horizontal direction (X direction) are set in the canvas area 20 (FIG. 9). From the upper of FIG. 3, odd-numbered arranging lines PL1, PL3 of the four arranging lines PL1 to PL4 are also referred to as odd arranging lines and even-numbered arranging lines PL2, PL4 are also referred to as even arranging lines. From the left, odd-numbered arranging positions of the four arranging positions on each arranging line are also referred to as odd arranging positions and even-numbered arranging positions are also referred to as even arranging positions. In this illustrative embodiment, the arranging sequence AN of the odd arranging position on the odd arranging line and the even arranging position on the even arranging line is determined as a preceding sequence of the arranging sequence AN of the even arranging position on the odd arranging line and the odd arranging position on the even arranging line. That is, the arranging sequence AN of the positions P1, P3 on the line PL1, the positions P6, P8 on the line PL2, the positions P9, P11 on the line PL3 and the positions P14, P16 on the line PL4 is determined as a sequence of first to eighth. The arranging sequence AN of the positions P2, P4 on the line PL1, the positions P5, P7 on the line PL2, the positions P10, P12 on the line PL3 and the positions P13, P15 on the line PL4 is determined as a sequence of ninth to sixteenth. The arranging sequence AN defined in this illustrative embodiment is defined as an arranging pattern in which black positions of checkered flag is first arranged and then white positions of the checkered flag is arranged.

In step S230, the CPU 410 changes a size of the material image 5. Specifically, the CPU 410 enlarges the size of the material rectangle image 17 including the material image 5 at magnification randomly selected from a predetermined range, thereby generating the enlarged material rectangle image 17. In this illustrative embodiment, the magnification is selected from a range of 100% to 120%.

In step S240, the CPU 410 changes a color of the material image 5. Specifically, the CPU 410 corrects a color value (each value of RGB, in this illustrative embodiment) of each pixel in the enlarged material rectangle image 17 by using a one-dimensional look-up table.

Figure 11:
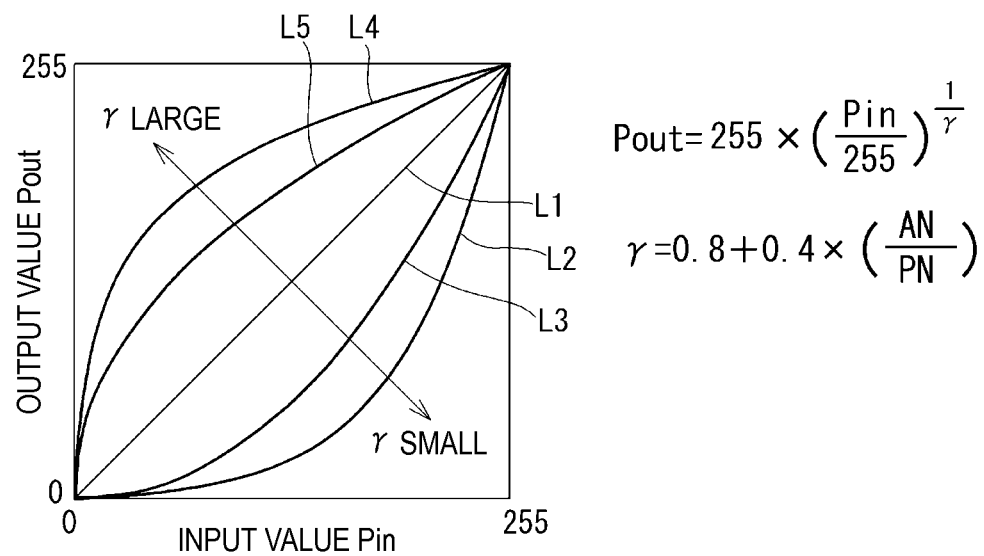
FIG. 11 illustrates an example of a one-dimensional look-up table of this illustrative embodiment.

FIG. 11 illustrates an example of the one-dimensional look-up table of this illustrative embodiment. In this illustrative embodiment, the one-dimensional look-up table is a table in which an input value Pin and an output value Pout of a γ-curve shown in FIG. 11 are associated with each other. The tone curves L2 to L5 are represented by an equation (refer to FIG. 11) in which the output value Pout is obtained by multiplying a maximum gradation value 255 as a coefficient by $(1/\gamma)$ power of a normalized value (Pin/255) of the input value Pin. In FIG. 11, a line L1 is a line indicating that the input value Pin and the output value Pout are the same, and corresponds to γ (=1). The tone curves L4, L5 are tone curves of γ>1, and are used for correction to increase the brightness.

Further, the tone curves L2, L3 are tone curves of γ<1, and are used for correction to decrease the brightness. The larger an absolute value of (γ−1), a change amount between a color value before the correction and a color value after the correction increases (a correction level is high).

The γ value defining the correction level is calculated using the equation of FIG. 11. PN indicates the number of arrangements of the material image 5 and AN indicates the arranging sequence AN of the material images 5 being currently processed. As can be seen from the equation, the γ value is set to be a larger value as the arranging sequence AN increases, within a range of 0.8≤γ≤1.2. That is, as the arranging sequence AN increases, the material image 5 becomes brighter stepwise.

Figure 12:
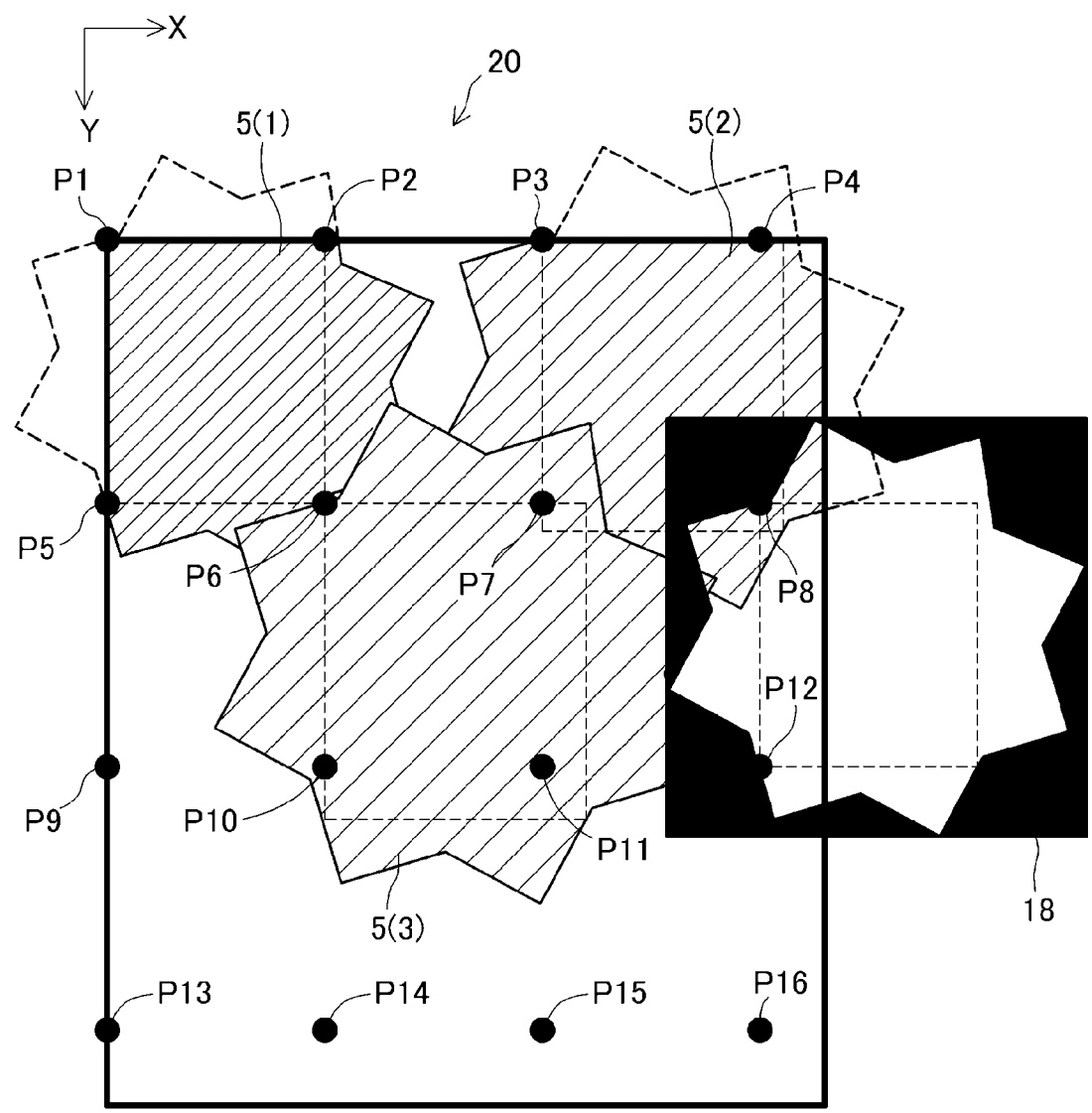
FIG. 12 illustrates arranging processing of material images 5.

In step S250, the CPU 410 arranges the material image 5 whose color or size has been changed in the canvas area 20 in accordance with the arranging sequence AN. FIG. 12 illustrates the arranging processing of the material images 5. The material image 5 arranged in the canvas area 20 is hereinafter represented as the material image 5(AN). Further, for example, the material image 5 of which the arranging sequence AN is fourth is represented as the material image 5(4). FIG. 12 illustrates a process during which the three material images 5(1) to 5(3) of which the arranging sequences AN are first to third are arranged and the fourth material image 5(4) is arranged.

In the arranging processing, the CPU 410 associates a coordinate system of the canvas area 20 and a coordinate system of the material rectangle image 17 so that the representative point PR (FIG. 7B) of the inscribed rectangle IS of the material image 5 coincides with one arranging position in the canvas area 20 in accordance with the arranging sequence AN. Since the coordinate system of the material rectangle image 17 and a coordinate system of the mask image 18 are the same, it can be said that the coordinate system of the canvas area 20 and the coordinate system of the mask image 18 are associated with each other. In the example of FIG. 12, a relative position of the mask image 18 to the arranging position P8 (FIG. 10) of which the arranging sequence AN is fourth is shown.

The CPU 410 sets a plurality of pixels in the material rectangle image 17 as an attention pixel one by one and executes next processing for each pixel in the material rectangle image 17. That is, the CPU 410 refers to a value of a pixel in the mask image 18 corresponding to the attention pixel in the material rectangle image 17. When the referring value of the pixel in the mask image 18 is the first value, the CPU replaces a color value of the pixel in the canvas area 20 corresponding to the attention pixel in the material rectangle image 17 with the color value of the attention pixel in the material rectangle image 17. When the referring value of the pixel in the mask image 18 is the second value, the CPU 410 holds, as it is, the color value of the pixel in the canvas area 20 corresponding to the attention pixel in the material rectangle image 17. Incidentally, when the attention pixel in the material rectangle image 17 is positioned outside the canvas area 20, i.e., when there is no pixel in the canvas area 20 corresponding to the attention pixel in the material rectangle image 17, the CPU proceeds to the processing of a next attention pixel.

As a result, only the material image 5 of the material rectangle image 17 is arranged in the canvas area 20.

When each material image 5 is arranged, the above-described processing is performed, irrespective of whether there is another material image 5 already arranged in the canvas area 20. Therefore, in an area in which the material image 5 having the preceding arranging sequence AN and the material image 5 having the following arranging sequence AN overlap with each other, the material image 5 having the preceding arranging sequence AN is erased, so that the material image 5 having the following arranging sequence AN is arranged. That is, when there is an area in which the material image 5 having the preceding arranging sequence AN and the material image 5 having the following arranging sequence AN overlap with each other, it can be said that the material image 5 having the following arranging sequence AN is superimposed on the material image 5 having the preceding arranging sequence AN. For example, in the example of FIG. 12, when the material image 5(4) of which the arranging sequence AN is fourth is arranged, the material image 5(4) is superimposed on the material image 5(2), so that a right-lower part of the material image 5(2) is erased.

In step S260, the CPU 410 determines whether the PN material images 5 have been arranged. When all the material images 5 are not arranged (step S260: NO), the CPU 410 returns to step S230 and arranges the next material image 5 (steps S230 to S250). When all the material images 5 are arranged (step S260: YES), the CPU 410 ends the material image arranging processing. When the material image arranging processing is over, the texture image generating processing (FIG. 6) is over.

Figure 13:
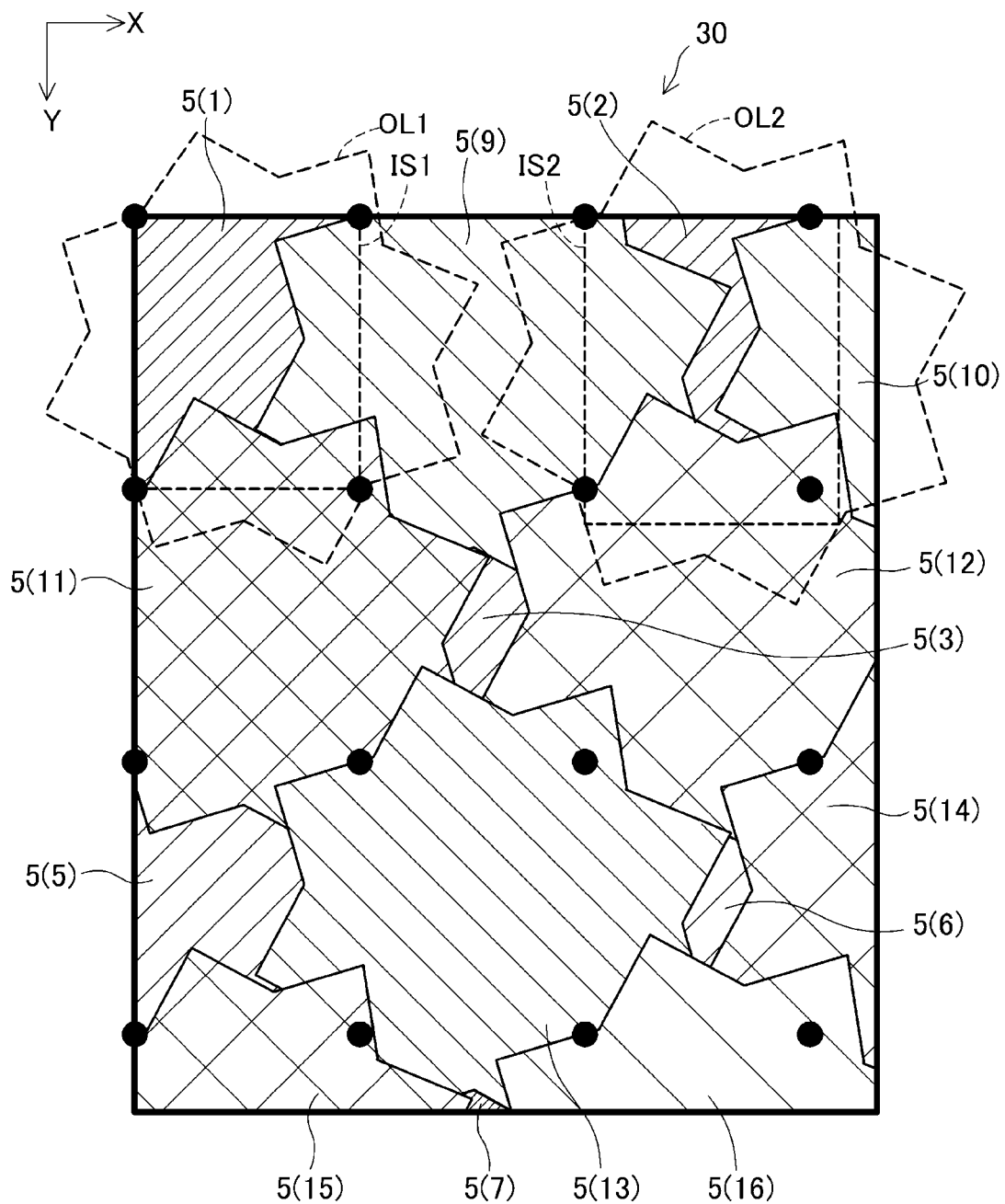
FIG. 13 illustrates an example of a generated texture image 30.

FIG. 13 illustrates an example of the generated texture image 30. The texture image 30 includes the plurality of material images 5. In the material image arranging processing, there is a possibility that an entire material image arranged will be finally erased by the plurality of other material images 5 arranged later. Therefore, the texture image 30 may not include the PN material images 5.

FIG. 13 shows the arranging positions P1 to P16 used when generating the texture image 30. Further, the inscribed rectangles IS1, IS2 of the material images 5(1), 5(2) are shown with broken lines. The inscribed rectangles IS1, IS2 of FIG. 13 are inscribed rectangles of the material images 5 of which sizes have been changed in step S230 of FIG. 6. As can be seen from FIG. 13, the material image 5(9) and the inscribed rectangle IS1 of the material image 5(1) continuing in a left direction of the material image 5(9) overlap with each other. Further, the material image 5(9) and the inscribed rectangle IS2 of the material image 5(2) continuously arranged in a right direction of the material image 5(9) overlap with each other. Like this, the plurality of material images 5 is arranged, so that it is possible to suppress a gap from occurring between the plurality of material images 5 in the texture image 30. For example, even when an outer shape of the material image is not a simple shape such as a rectangle, the material images can be arranged without a gap. In this illustrative embodiment, the outer shape of the material image 5 includes a plurality of sides that is relatively complexly arranged, like teeth of a saw. However, it can be seen that the plurality of material images 5 is arranged without a gap in the texture image 30 of FIG. 13. As a result, it is possible to improve the outward appearance of the texture image 30, so that it is possible to generate the texture image 30 having a good outward appearance by using the material images 5.

Further, as shown in FIG. 9, the plurality of arranging positions P1 to P16 is determined as the positions of lattice points at which the inscribed rectangles IS (FIG. 7B) are arranged. In other words, the arranging position of the material image 5 is determined, based on the inscribed rectangle IS of the material image 5 before the size thereof is changed (i.e., the size is enlarged) in step S230 of FIG. 8. Further, the plurality of arranging positions P1 to P16 is determined so that the inscribed rectangles IS of the two material images 5 continuously arranged before the enlargement abut on each other. More specifically, for example, all sides of the inscribed rectangle IS of the material image 5(3) before the enlargement abut on any one of the plurality of other material images. That is, the plurality of arranging positions P1 to P16 is determined so that the upper, lower, left and right sides of the inscribed rectangle IS of the material image 5(3) before the enlargement abut on the inscribed rectangles of the four material images 5(9), 5(11), 5(12), 5(13) before the enlargement. As a result, when generating the texture image 30, it is possible to arrange the plurality of material images 5 without a gap.

Further, the CPU 410 arranges the plurality of material images 5 (FIGS. 5 and 7) configured by the plurality of continuing object pixels to thus generate the texture image 30. Therefore, it is possible to suppress a gap from occurring in the texture image 30.

Further, the CPU 410 determines the arranging position of the material image 5, based on the maximum inscribed rectangle IS inscribed in the outline of the material image 5 before the enlargement. Therefore, it is possible to securely generate the texture image 30 in which the plurality of material images 5 is arranged without a gap and to suppress the overlapping parts of the respective material images 5 from being excessively increased. As a result, it is possible to improve the outward appearance of the texture image 30.

Further, the CPU 410 determines the arranging sequence AN of the material image 5 (step S220 in FIG. 8) after the 16 arranging positions are determined in advance (step S210 in FIG. 8) and before the material images 5 are arranged in the canvas area 20 (step S230 to S260 in FIG. 8). As a result, it is possible to freely set the arranging sequence AN of the material image 5. Thereby, as compared to a simple arranging sequence, for example, a configuration where processing of arranging the material images 5 from the left towards the right on one arranging line is sequentially executed from the upper arranging line to the lower arranging line, it is possible to generate the texture images 30 of various tastes.

Specifically, in FIG. 13, seeing the three material images 5(1), 5(9), 5(2) arranged in the horizontal direction, a left part of the material image 5(9) is superimposed on the material image 5(1) positioned at the left of the material image 5(9). In FIG. 13, virtual lines OL1, OL2 indicating outer edges of the material images 5(1), 5(2) are shown so as to easily understand. The outer edges OL1, OL2 of the material images 5(1), 5(2) do not appear in the texture image 30 because the other material images such as the material image 5(9) are superimposed thereon. A right part of the material image 5(9) is superimposed on the material image 5(2) positioned at the right of the material image 5(9). The overlapping shape does not occur when the plurality of material images 5 is arranged in the above-described simple arranging sequence. In this illustrative embodiment, since the overlapping shape can be realized, the outward appearance of the texture image 30 can be improved.

More specifically, the arranging sequence AN described with reference to FIG. 10 is adopted. As a result, the overlapping shape of the material images 5 is different between the material images 5(1), 5(9), 5(2), 5(10) configuring the first line along the horizontal direction and the material images 5(11), 5(3), 5(12) configuring the second line downwardly adjacent to the first line in the texture image 30. That is, on the first line, the even material images 5(9), 5(10) from the left are arranged to be superimposed on the odd material images 5(1), 5(2) from the left. On the second line, the odd material images 5(11), 5(12) from the left are arranged to be superimposed on the even material image 5(3) from the left. In this way, the plurality of material images 5 is superimposed, so that the outward appearance of the texture image 30 can be improved.

Furthermore, in the texture image 30 of this illustrative embodiment, the plurality of material images 5 having different sizes is continuously arranged (step S230 of FIG. 8; FIG. 13). As a result, the arrangement of the material images 5 in the texture image 30 is further suppressed from being simplified. As a result, the outward appearance of the texture image 30 can be improved.

Furthermore, the material image 5 is arranged, based on the inscribed rectangle IS of the material image 5 before the size thereof is enlarged in step S230 of FIG. 8 (FIGS. 9 and 12). As a result, even when the material images 5 having the different sizes are arranged, it is possible to suppress a gap from occurring between the plurality of material images 5.

Further, since the color of the material image 5 is corrected in step S240 of FIG. 8, the texture image 30 includes the plurality of material images 5 having the different colors. As a result, as compared to an image including only the material images having the same color, it is possible to generate the texture image 30 having different tastes. As a result, it is possible to improve the outward appearance of the texture image 30.

More specifically, the brightness of the plurality of material images 5 is changed stepwise (FIG. 11) in the texture image 30 in accordance with the overlapping sequence of the plurality of material images 5. Therefore, it is possible to improve the outward appearance of the texture image 30. In the example of FIG. 11, the correction is executed for the material image 5 so that the material image 5, which is superimposed later, has a brighter color. As a result, it is possible to add a sense of depth to the outward appearance of the texture image 30.

Returning to FIG. 3, when the texture image generating processing is over, synthesis processing is executed in step S55. The synthesis processing is processing of synthesizing the texture image 30 into the synthesis target area 10B (FIG. 2) of the template image 10, thereby generating synthesis image data representing a synthesis image.

Specifically, the CPU 410 refers to the area information 12 (FIG. 2C) to thus acquire a position (coordinates) of the left-upper apex SP1 of the circumscribed rectangle 10C of the synthesis target area 10B on the template image 10. The CPU 410 associates the coordinate system of the template image 10 and the coordinate system of the texture image 30 so that a pixel of the apex SP1 of the synthesis target area 10B corresponds to a pixel of a left-upper apex of the texture image 30.

Then, the CPU 410 sets the pixels of the texture image 30 as an attention pixel one by one, thereby executing next processing for each pixel in the texture image 30. That is, the CPU 410 refers to a pixel in the mask image 11 (FIG. 2B) corresponding to the attention pixel in the texture image 30. When a value of the referring pixel in the mask image 11 is the second value, the CPU 410 replaces a color value of a pixel in the template image 10 corresponding to the referring pixel in the mask image 11 with the color value of the attention pixel in the texture image 30. When the referring value of the pixel in the mask image 11 is the first value, the CPU 410 holds, as it is, the color value of the pixel in the template image 10 corresponding to the referring pixel in the mask image 11.

As a result, the color values of the plurality of pixels configuring the synthesis target area 10B of the template image 10 are replaced with the color values of the pixels in the texture image 30, so that the synthesis image data is generated.

Figure 14A:
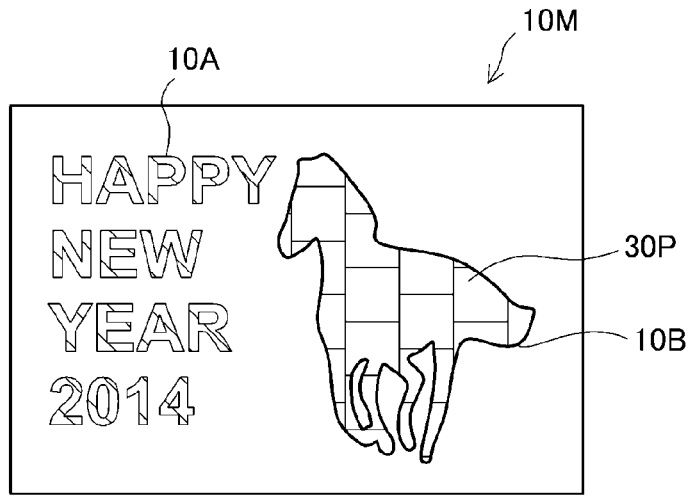
FIGS. 14A and 14B illustrate an example of a synthesis image 10M represented by synthesis image data.
Figure 14B:
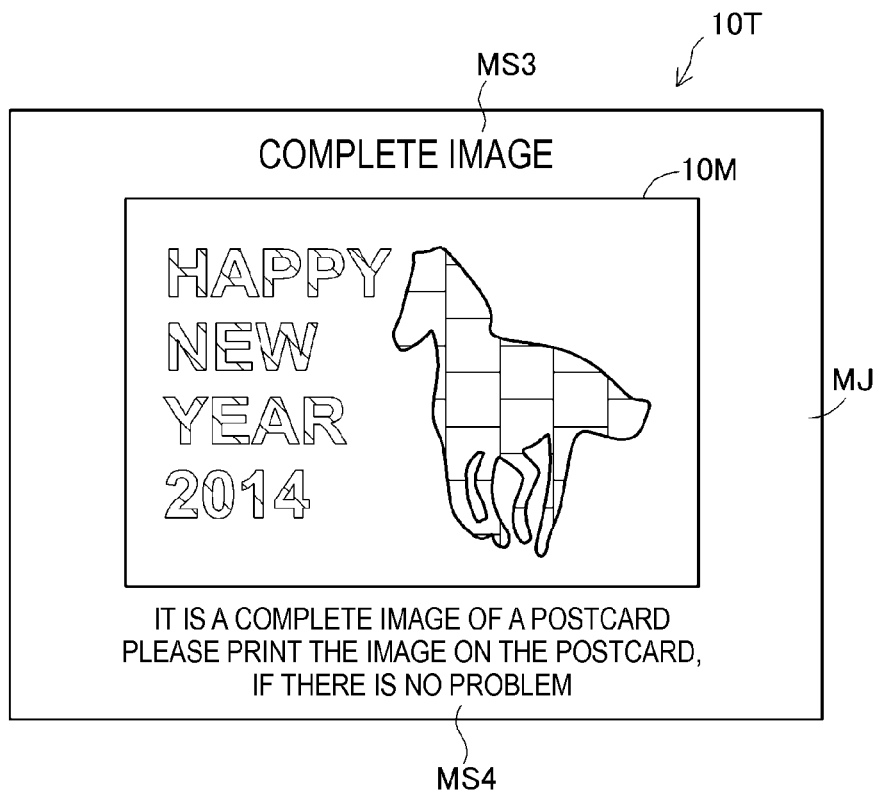

FIG. 14 illustrates an example of a synthesis image 10M represented by the synthesis image data. In the synthesis image 10M, a partial image 30P of the texture image 30 having a shape (a horse shape in the example of FIG. 2) of the synthesis target area 10B is synthesized in the synthesis target area 10B.

In step S60, the CPU 410 generates test image data representing a test image 10T (FIG. 14B) by using the synthesis image data generated in step S55. The test image 10T includes the synthesis image 10M and a blank MJ. In the blank MJ, messages MS3, MS4 indicating that the test image 10T is an image for test printing of the synthesis image 10M are arranged.

Incidentally, the synthesis image data representing the synthesis image 10M is image data for printing the synthesis image 10M on a postcard. On the other hand, the test image data representing the test image 10T is data for printing the test image 10T on an A4 sheet larger than the postcard. A size on the postcard of the synthesis image 10M to be printed on the postcard by using the synthesis image data is the same as a size on the sheet of the synthesis image 10M in the test image 10T to be printed on the A4 sheet by using the test image data. For this reason, a user seeing the test image 10T printed on the A4 sheet can appropriately check a content of the synthesis image 10M when it is printed on the postcard, without printing the synthesis image 10M on the postcard.

In step S65, the CPU 410 transmits the generated synthesis image data and the test image data to the multi-function device 200 and ends the processing. When the synthesis image data and the test image data are received, the CPU 210 of the multi-function device 200 stores the corresponding data in the buffer area 221 and notifies the user that the synthesis image data and the test image data are received.

The synthesis image data and the test image data are provided to the user. The user enables the multi-function device 200 to print the test image 10T on the A4 sheet, for example. Then, the user checks the synthesis image 10M included in the test image 10T printed on the A4 sheet. When the user satisfies the content of the synthesis image 10M, the user enables the multi-function device 200 to print the synthesis image 10M on the postcard. When the user does not satisfy the content of the synthesis image 10M, the user may perform the generation of the synthesis image 10M one more time. For example, the user may change the template image or the material to be used and then enable the multi-function device 200 and the server 400 to execute the processing of FIG. 3 one more time.

According to the above illustrative embodiment, the texture image 30 having a good outward appearance is generated using the material image representing the material prepared by the user. The texture image 30 is synthesized in the template image 10, so that the attractive synthesis image 10M having originality can be generated.

Modifications to Illustrative Embodiments (1) In the above-described illustrative embodiment, the arranging position of the material image 5 is determined, based on the inscribed rectangle IS of the material image 5 before the size thereof is enlarged in step S230 of FIG. 8 (step S210 of FIG. 8; FIG. 9). Instead of this configuration, the arranging position of the material image 5 may be determined using the inscribed rectangle of the material image 5 after the size thereof is enlarged. In this case, for example, when determining the arranging position in the canvas area 20 (step S210), the CPU 410 arranges the inscribed rectangle of the material image 5 having a size to be arranged in the canvas area 20, thereby determining the arranging position of the material image. For example, the CPU 410 may predetermine the magnification, which is used when enlarging the material image 5 (step S230 of FIG. 8), and arrange the inscribed rectangle IS enlarged at the predetermined magnification in the canvas area 20 to thus determine the arranging position of the material image.

FIG. 15 illustrates an example of the canvas area 20 and the arranging position in a modified embodiment. In the example of FIG. 15, material images having two types of sizes, i.e., a material image 51 and a material image 52 larger than the material image 51 are alternately arranged in the vertical and horizontal directions. In this case, the CPU 410 arranges a first inscribed rectangle ISA, which is inscribed in an outline of the material image 51, and a second inscribed rectangle ISB, which is inscribed in an outline of the material image 52, in the canvas area 20. In FIG. 15, a hatched rectangle shown with the broken line indicates the first inscribed rectangle ISA and a non-hatched rectangle shown with the broken line indicates the second inscribed rectangle ISB.

The CPU 410 arranges the plurality of inscribed rectangles ISA, ISB along a first arranging line HL1 so that sides of the inscribed rectangles ISA, ISB adjacent to each other in the horizontal direction abut on each other. Then, the CPU 410 determines a position of a second arranging line HL2 in the vertical direction, which is adjacent to the first arranging line in a downward direction (+Y direction), on the basis of the inscribed rectangle of the minimum material image of the plurality of material images arranged along the first arranging line HL1. In the example of FIG. 15, a position of the second arranging line HL2 in the vertical direction is determined on the basis of the first inscribed rectangle ISA of the material image 51 having a smaller size of the two material images 51, 52. Specifically, the position of the second arranging line HL2 is determined as a lower end position of the first inscribed rectangle ISA of the material image 51 having a smaller size. Likewise, a third arranging line HL3 is determined as the lower end of the first inscribed rectangle ISA of the material image 51 arranged along the second arranging line HL2, and a fourth arranging line HL4 is determined as the lower end of the first inscribed rectangle ISA of the material image 51 arranged along the third arranging line HL3.

In the texture image of this modified embodiment, the plurality of material images 51, 52 arranged along the first arranging line HL1 is referred to as a first material image group and the plurality of material images 51, 52 arranged along the second arranging line HL2 is referred to as a second material image group. In the arranging method of this modified embodiment, it can be said that the second material image group is arranged with respect to the first material image group, based on the inscribed rectangle of the smallest material image belonging to the first material image group. Meanwhile, in the arranging method of the above-described illustrative embodiment, it can be said that the second material image group is arranged with respect to the first material image group, based on the inscribed rectangle of the material image having a size before the enlargement. In any case, it is possible to suppress a gap from occurring between the plurality of material images. As a result, it is possible to improve the outward appearance of the texture image.

(2) In the above-described illustrative embodiment, the processing of changing the size of the material image 5 (step S230 in FIG. 8) and changing the color of the material image 5 (step S240 in FIG. 8) may be omitted. Further, the processing of generating the ordinal data 22 may be omitted and the material images 5 may be arranged in the simple arranging sequence AN.

Figure 16:
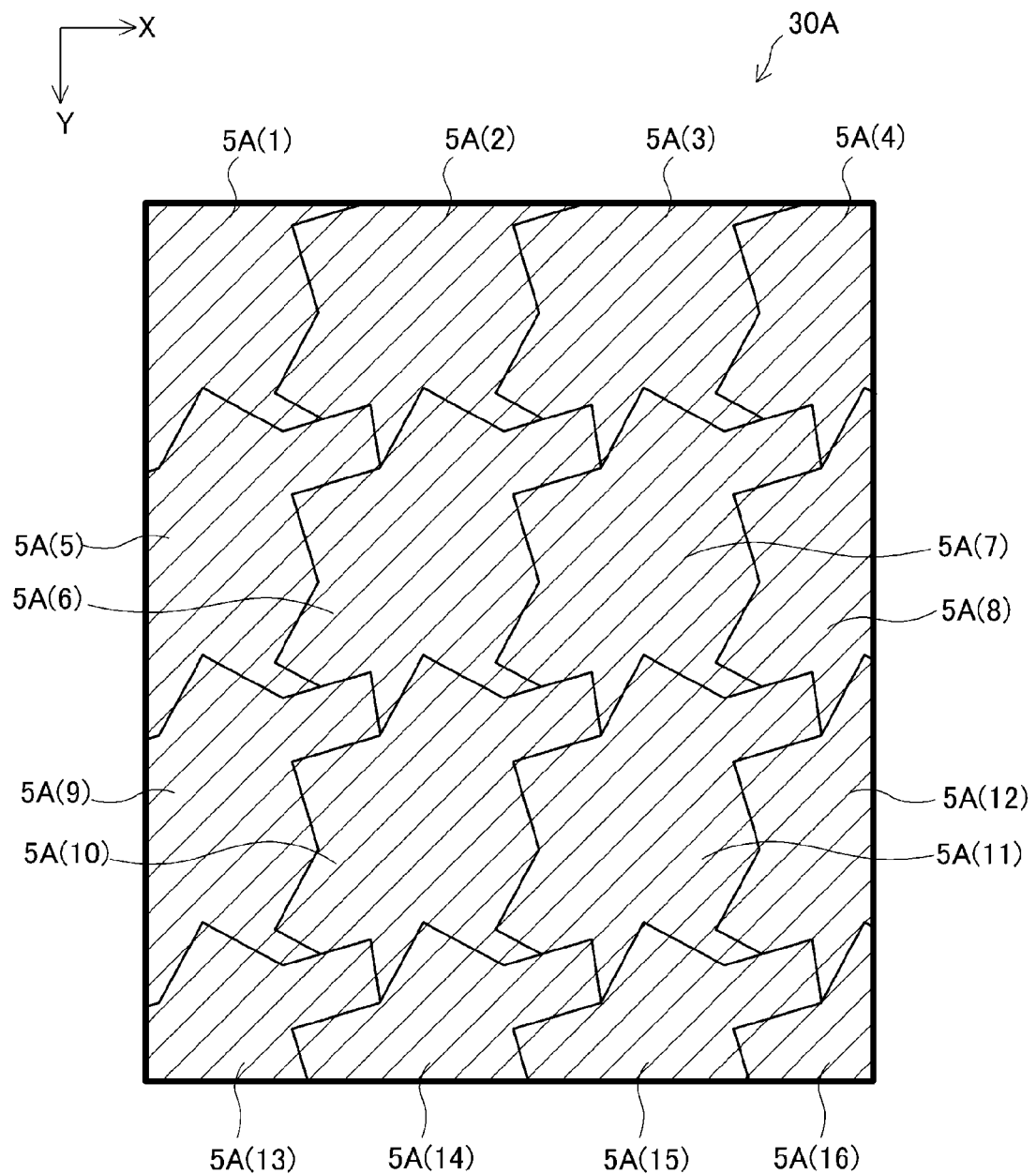
FIG. 16 illustrates a texture image 30A in another modified exemplary embodiment.

FIG. 16 illustrates a texture image 30A in a modified embodiment. The texture image 30A is an image generated by material image arranging processing in which the change in the size of the material image 5 and the change in the color of the material image 5 are omitted and the material images 5 are arranged in a simple arranging sequence. In the texture image 30A, 16 material images 5A(1) to 5A(16) having the same color and shape are regularly arranged. The number in the parenthesis of the reference numeral of the material image indicates the arranging sequence AN of the material image, like the above-described illustrative embodiment. As can be seen from the number, in this modified embodiment, the simple arranging sequence is adopted in which processing of arranging the material images from the left towards the right on one horizontal arranging line is sequentially executed from the upper arranging line to the lower arranging line. Like this, the texture image 30A (FIG. 15) of this modified embodiment is an image having a largely different impression from the texture image 30 (FIG. 13) of the above-described illustrative embodiment. For this reason, whether or not to change the size or color of the material image 5 or a degree of the change, a pattern of the arranging sequence AN and the like may be appropriately set in accordance with a user's instruction. In this way, it is possible to generate a variety of texture images by using one material image 5 in accordance with user's tastes.

(3) In FIG. 9, the plurality of inscribed rectangles IS is arranged without a gap in the canvas area 20 so as to determine the 16 arranging positions P1 to P16. However, the inscribed rectangles may be arranged with a slight gap therebetween. For example, a horizontal gap between the two inscribed rectangles IS adjacent to each other in the horizontal direction is preferably smaller than a half of an average value of intervals RM, LM (FIG. 7B) between the left and right sides of the inscribed rectangle of the material image 5 and the left and right sides of the circumscribed rectangle of the material image 5. Further, a vertical gap between the two inscribed rectangles IS adjacent to each other in the vertical direction is preferably smaller than a half of an average value of intervals DM, UM (FIG. 7B) between the upper and lower sides of the inscribed rectangle of the material image 5 and the upper and lower sides of the circumscribed rectangle of the material image 5. In this way, it is possible to generate a texture image in which one material image is arranged so that it overlaps with the inscribed rectangle IS of another material image continuing to the one material image.

(4) In the above-described illustrative embodiment, the shape of the internal area of the material image 5, which is used as the reference when arranging the material image 5 in the canvas area 20, is the inscribed rectangle inscribed in the outline of the material image 5. However, the disclosure is not limited thereto. For example, a figure that is not inscribed in the outline of the material image 5 and a polygon different from the rectangle may be also possible. Further, the shape of the internal area of the material image 5 is preferably a shape that can be arranged in the canvas area 20 without a gap.

(5) In the above-described illustrative embodiment, the arranging sequence AN (FIG. 10) of the material images 5 is exemplary and the disclosure is not limited thereto. For example, the arranging sequence may be randomly determined on the basis of the random numbers. In this way, it is possible to generate a texture image having a mood different from the texture image 30 of FIG. 13.

(6) In step S240 of the above-described illustrative embodiment, the color of the material image 5 is changed so that the brightness thereof is stepwise changed, in accordance with the arranging sequence AN. Instead of this configuration, the color of the material image 5 may be changed so that the brightness is randomly changed. Further, the color of the material image 5 may be changed so that the color is changed stepwise or randomly, in accordance with the arranging sequence AN.

(7) In the above-described illustrative embodiment, the texture image 30 is generated using the scan image 14 that is obtained by reading the material prepared by the user. Instead of this configuration, the texture image 30 may be generated using a variety of digital images such as a photograph and a drawing. The image data representing the images is acquired from a storage device such as a USB memory possessed by the user and is then transmitted to the server 400.

(8) In the above-described illustrative embodiment, the image processing (for example, the processing of steps S45 to S60 in FIG. 3) that is executed by the CPU 410 of the server 400 may be executed by an apparatus different from the server 400, for example, the CPU 210 of the multi-function device 200. In this case, the CPU 210 generates the synthesis image and then outputs the test image data and synthesis image data to the printer unit 240, thereby enabling the printer unit 240 to print the test image 10T and synthesis image 10M (FIG. 15), for example. Further, the image processing may be executed by a CPU (not shown) of the PC 500 (FIG. 1) connected to a printing apparatus such as a printer. In this case, the CPU generates the synthesis image and then outputs the test image data and synthesis image data to an external printer, thereby enabling the external printer to print the test image 10T and synthesis image 10M (FIG. 15). That is, the output of the test image data and synthesis image data includes the transmission from the server 400 to the client apparatus (for example, the multi-function device 200) (one illustrative embodiment), the supply from the CPU 210 in the multi-function device 200 to the printer unit 240, the transmission from the PC 500 to the external printer, and the like.

(9) The image processing may be executed by a scanner driver that is installed in the PC 500 so as to control the scanner unit 250 of the multi-function device 200 or a stand-alone scanner (not shown). Further, the server 400 may be configured by one computing machine, like the illustrative embodiment, or may be configured by a computing system (for example, a distributed computing system for implementing a so-called cloud computing) including a plurality of computing machines.

(10) In the above-described illustrative embodiment, a part of the configuration implemented by the hardware may be replaced with software and a part of the configuration implemented by the software may be replaced with hardware.

What is claimed is:
1. An image processing apparatus comprising:
a processor; and
a memory storing instructions, the instructions, when executed by the processor, causing the image processing apparatus to perform:
receiving first image data representing a first image;
specifying a partial image included in the first image;
specifying an internal area included in the partial image; and
generating a second image in which the partial image is continuously arranged as at least a first partial image and a second partial image,
wherein the second partial image is arranged continuously to the first partial image and overlaps with the internal area of the first partial image.
2. The image processing apparatus according to claim 1, wherein the generating the second image comprises generat- ing the second image in which a plurality of partial images are arranged without a gap therebetween.

3. The image processing apparatus according to claim 1, wherein the generating the second image comprises generating the second image in which the internal area of the first partial image and the internal area of the second partial image abut on each other.

4. The image processing apparatus according to claim 1, wherein the generating the second image comprises generating the second image in which all sides configuring the internal area of the first partial image abut on any one of a plurality of sides configuring an internal area of the second partial image.

5. The image processing apparatus according to claim 1, wherein the specifying the partial image comprises:
- classifying a plurality of pixels in an area having at least the partial image of the first image into background pixels representing a background and object pixels representing an object; and
- specifying the partial image configured by the object pixels.

6. The image processing apparatus according to claim 5, wherein the specifying the partial image comprises specifying the partial image configured by a plurality of continuing object pixels.

7. The image processing apparatus according to claim 1, wherein the internal area is an inscribed rectangle that is a rectangle inscribed in an outline of the partial image.

8. The image processing apparatus according to claim 7, wherein the inscribed rectangle is a maximum rectangle inscribed in the outline of the partial image.

9. The image processing apparatus according to claim 1,
- wherein the second image comprises a third partial image that is arranged continuously to the second partial image,
- wherein the first partial image, the second partial image and the third partial image are arranged in a specific direction, and
- wherein the second partial image is arranged to overlap the first partial image and the third partial image.

10. The image processing apparatus according to claim 9,
- wherein the second image comprises a plurality of partial images arranged in a first line following the specific direction and a plurality of partial images arranged in a second line adjacent to the first line and following the specific direction,
- wherein an even partial image of the first line is arranged to overlap an odd partial image of the first line, and
- wherein an odd partial image of the second line is arranged to overlap an even partial image of the second line.

11. The image processing apparatus according to claim 10, wherein the sequence of overlapping partial images in the second image is randomly determined.

12. The image processing apparatus according to claim 1,
- wherein the instructions, when executed by the processor, cause the image processing apparatus to further perform changing the size of the partial image, and
- wherein the generating the second image comprises generating the second image in which a plurality of partial images having different sizes is continuously arranged.

13. The image processing apparatus according to claim 12, wherein the second image comprises:
- a first partial image group comprising the plurality of partial images arranged in a specific direction and having different sizes; and
- a second partial image group comprising a plurality of partial images, the second partial image group being adjacent to the first partial image group in a direction intersecting with the specific direction, and
- wherein the generating the second image comprises arranging the second partial image group with respect to the first partial image group, based on the internal area of the smallest partial image belonging to the first partial image group.

14. The image processing apparatus according to claim 12,
- wherein the changing the size of the partial image comprises magnifying the partial image at different magnifications,
- wherein the second image comprises:
  - a first partial image group comprising the plurality of partial images arranged in a specific direction and having different sizes; and
  - a second partial image group comprising the plurality of partial images adjacent to the first partial image group in a direction intersecting with the specific direction, and
- wherein the generating the second image comprises arranging the second partial image group with respect to the first partial image group, based on the internal area of the partial image having a size before the magnification.

15. The image processing apparatus according to claim 1,
- wherein the instructions, when executed by the processor, cause the image processing apparatus to further perform changing a color of the partial image, and
- wherein the second image comprises a plurality of partial images having different colors.

16. The image processing apparatus according to claim 15, wherein the changing the color of the partial image comprises changing colors of a plurality of partial images stepwise in accordance with an overlapping sequence of the partial images in the second image.

17. The image processing apparatus according to claim 1,
- wherein the instructions, when executed by the processor, cause the image processing apparatus to further perform outputting first specific image data representing a specific image comprising the second image and second specific image data representing an image comprising the specific image and a blank, and
- wherein the size of the specific image printed on a first-type sheet by using the first specific image data is the same as the size of the specific image printed on a second-type sheet, which is larger than the first-type sheet, by using the second specific image data.

18. A non-transitory computer-readable medium having a computer program stored thereon and readable by a computer, the computer program, when executed by the computer, causes the computer to perform operations comprising:
- receiving first image data representing a first image;
- specifying a partial image included in the first image;
- specifying an internal area included in the partial image; and
- generating a second image in which the partial image is continuously arranged as at least a first partial image and a second partial image,
- wherein the second partial image is arranged continuously to the first partial image and overlaps with the internal area of the first partial image.

* * * * *